(12) United States Patent
Ruehl

(10) Patent No.: US 8,484,930 B2
(45) Date of Patent: Jul. 16, 2013

(54) BOXED FRAME MEMBER AND METHOD FOR MANUFACTURE

(76) Inventor: Phillip C. Ruehl, Elm Grove, WI (US)

( * ) Notice: Subject to any disclaimer, the term of this patent is extended or adjusted under 35 U.S.C. 154(b) by 921 days.

(21) Appl. No.: 11/279,321

(22) Filed: Apr. 11, 2006

(65) Prior Publication Data
US 2007/0107368 A1 May 17, 2007

Related U.S. Application Data

(60) Provisional application No. 60/732,451, filed on Nov. 1, 2005.

(51) Int. Cl.
*E04B 1/00* (2006.01)
*E04G 21/00* (2006.01)
*E04G 3/00* (2006.01)
*E04H 12/00* (2006.01)

(52) U.S. Cl.
USPC ........... 52/745.17; 52/843; 52/849; 52/650.1; 280/797

(58) Field of Classification Search
USPC ................ 52/843, 850, 831, 834, 787.1, 839, 52/838, 835, 849, 854, 845, 735.1, 650.1, 52/690, 696, 745.17; 280/785, 796, 797, 280/798, 799, 800, 781; 411/367, 546; 296/29, 296/30, 204, 205; 180/311
See application file for complete search history.

(56) References Cited

U.S. PATENT DOCUMENTS

| | | | |
|---|---|---|---|
| 294,852 A * | 3/1884 | Colby | 296/30 |
| 426,561 A * | 4/1890 | Ditchridge | 52/696 |
| 765,139 A * | 7/1904 | Hirsch | 411/368 |
| 1,191,729 A * | 7/1916 | Pool | 411/367 |
| 1,215,965 A | 2/1917 | Murray | |
| 1,491,563 A * | 4/1924 | Stresau | 280/800 |
| 1,835,243 A * | 12/1931 | Schaffert | 403/410 |
| 2,001,846 A | 5/1935 | Ledwinka | |

(Continued)

FOREIGN PATENT DOCUMENTS

DE 3317808 A1 11/1984
EP 1055829 11/2000

(Continued)

OTHER PUBLICATIONS

European Patent Office, communication Pursuant to Article 94(3) EPC in a patent application corresponding to U.S. Appl. No. 11/671,217, Jun. 23, 2009, 3 pages.

(Continued)

*Primary Examiner* — William Gilbert
(74) *Attorney, Agent, or Firm* — Nicholas A. Kees; Godfrey & Kahn, S.C.

(57) ABSTRACT

A box-type frame member assembly, and a method for assembling the box-type frame member. A first section, having a web, a pair of flanges and a number of holes with locators, is placed onto a fixture assembly with the holes fitting onto pilots. A spacer is placed over each of the pilots and engaged with the locator of the respective hole in the first section. A second section, having a web, a pair of flanges, and a number of holes with locators, is then placed onto the fixture assembly with the holes fitting onto the pilots, and second end of each spacer is engaged with the locator associated with the web of the second section. Finally, the flanges of the first and second sections are secured together.

12 Claims, 9 Drawing Sheets

U.S. PATENT DOCUMENTS

| | | | |
|---|---|---|---|
| 2,051,216 A | | 8/1936 | Jones et al. |
| 2,060,970 A | * | 11/1936 | Belden .................. 16/404 |
| 2,113,399 A | | 4/1938 | Dietrich |
| 2,113,403 A | * | 4/1938 | Harmon ................ 280/796 |
| 2,327,585 A | * | 8/1943 | Ulrich .................. 52/787.1 |
| 2,380,523 A | | 7/1945 | Hicks et al. |
| 2,467,516 A | | 4/1949 | Almdale |
| 2,883,232 A | | 4/1959 | Olley et al. |
| 3,344,370 A | | 9/1967 | Sewell |
| 3,508,784 A | | 4/1970 | Small |
| 4,011,786 A | * | 3/1977 | Liebig .................. 411/60.2 |
| 4,014,588 A | | 3/1977 | Kohriyama |
| 4,135,757 A | | 1/1979 | Smith et al. |
| 4,271,921 A | | 6/1981 | Ochsner |
| 4,283,898 A | * | 8/1981 | Claver .................. 52/584.1 |
| 4,819,980 A | | 4/1989 | Sakata et al. |
| 4,863,214 A | | 9/1989 | Kranis, Jr. |
| 4,934,861 A | * | 6/1990 | Weeks et al. .......... 403/408.1 |
| 5,061,528 A | | 10/1991 | Ruehl |
| 5,061,529 A | | 10/1991 | Ruehl |
| 5,139,361 A | | 8/1992 | Camuffo |
| 5,149,132 A | | 9/1992 | Ruehl et al. |
| 5,152,840 A | | 10/1992 | Ruehl |
| 5,176,417 A | | 1/1993 | Bauer |
| 5,194,302 A | | 3/1993 | Ruehl |
| 5,259,660 A | | 11/1993 | Haesters |
| 5,264,252 A | | 11/1993 | Ruehl |
| 5,264,253 A | | 11/1993 | Ruehl |
| 5,308,115 A | | 5/1994 | Ruehl et al. |
| 5,487,219 A | | 1/1996 | Ruehl et al. |
| 5,560,674 A | | 10/1996 | Tazaki et al. |
| 5,573,222 A | | 11/1996 | Ruehl et al. |
| 5,682,678 A | * | 11/1997 | Gallagher et al. ....... 29/897.32 |
| 5,865,362 A | | 2/1999 | Behrmann et al. |
| 5,980,174 A | * | 11/1999 | Gallagher et al. .......... 411/55 |
| 6,010,155 A | | 1/2000 | Rinehart |
| 6,017,073 A | | 1/2000 | Lindblom et al. |
| 6,138,357 A | | 10/2000 | Jones |
| 6,186,696 B1 | * | 2/2001 | Valin .................... 403/306 |
| 6,189,285 B1 | * | 2/2001 | Mockry .................. 52/843 |
| 6,205,736 B1 | | 3/2001 | Amborn et al. |
| 6,216,763 B1 | | 4/2001 | Ruehl et al. |
| 6,237,304 B1 | * | 5/2001 | Wycech .................. 52/847 |
| 6,299,210 B1 | | 10/2001 | Ruehl et al. |
| 6,309,157 B1 | * | 10/2001 | Amann et al. .......... 411/353 |
| 6,394,537 B1 | | 5/2002 | DeRees |
| 6,543,828 B1 | | 4/2003 | Gass |
| 6,585,468 B2 | * | 7/2003 | Johnson et al. .......... 411/353 |
| 6,688,826 B2 | * | 2/2004 | Agha et al. ............. 411/352 |
| 6,733,040 B1 | | 5/2004 | Simboli |
| 6,769,851 B2 | * | 8/2004 | Agha et al. ............. 411/353 |
| 6,910,671 B1 | * | 6/2005 | Norkus et al. ............ 248/635 |
| 7,144,040 B2 | * | 12/2006 | Kiehl et al. .............. 280/785 |
| 7,201,398 B1 | * | 4/2007 | Christofaro et al. ...... 280/781 |
| 7,219,954 B2 | | 5/2007 | Gomi et al. |
| 7,275,296 B2 | | 10/2007 | DiCesare |
| 7,300,536 B1 | | 11/2007 | Wang et al. |
| 7,393,015 B1 | | 7/2008 | Gillespie et al. |
| 2001/0039712 A1 | | 11/2001 | Ruehl et al. |
| 2002/0163173 A1 | | 11/2002 | Ruehl et al. |
| 2003/0184075 A1 | * | 10/2003 | Freeman et al. .......... 280/797 |
| 2005/0117997 A1 | * | 6/2005 | Pinzl .................... 411/367 |
| 2006/0091701 A1 | * | 5/2006 | DiCesare ................ 296/205 |
| 2006/0193714 A1 | * | 8/2006 | Werner .................. 411/546 |
| 2006/0228194 A1 | * | 10/2006 | Nilsen et al. ............. 411/546 |
| 2007/0107368 A1 | * | 5/2007 | Ruehl .................... 52/731.2 |
| 2008/0029330 A1 | * | 2/2008 | DiCesare ................ 180/311 |
| 2008/0072528 A1 | * | 3/2008 | Wolfe .................... 52/731.2 |

FOREIGN PATENT DOCUMENTS

| | | |
|---|---|---|
| EP | 1055829 A2 | 11/2000 |
| EP | 1984636 B1 | 8/2007 |
| JP | 404011582 | 1/1992 |
| WO | WO2006/045194 A1 | 5/2006 |
| WO | WO2006045194 | 5/2006 |

OTHER PUBLICATIONS

WIPO, International Search Report for PCT/US2007/051452, corresponding to U.S. Appl. No. 11/670,217, Jul. 24, 2007, 4 pages.
WIPO, International Search Report for PCT/US20047/061452, corresponding to U.S. Appl. No. 11/670,217, Jul. 24, 2007, 4 pages.
Representation of prior art vehicle frame rail, undated, 1 page.
Information, photos and renderings of prior art vehicle frame rails and components, undated, 11 pages.

* cited by examiner

BOXED FRAME MEMBER AND METHOD FOR MANUFACTURE

CROSS REFERENCE TO PRIOR APPLICATION

This application claims priority to U.S. Provisional Patent Application Ser. No. 60/732,451, filed on Nov. 1, 2005, the disclosure of which is incorporated herein by reference in its entirety for all purposes.

BACKGROUND OF THE INVENTION

The present invention relates generally to the field of frames. In particular, the present invention relates to the use of frame rails including a spacer. The frame rails may be employed in numerous applications, such as automotive vehicles.

U.S. Pat. No. 2,327,585 discloses a bolt spacer or reinforcing member. In particular, the patent pertains to a means for installing bolt spacers and reinforcing members in a structural member having a box cross-section formed using channels. The patent teaches a structural member comprising three elements. These elements comprise a channel member made of metal forming a first panel, which is attached to the second element, a second panel member. The third element includes flanges and a plurality of sockets. The sockets are preferably formed in the side of the element by "di-pressing." The sockets receive multiple reinforcing elements depicted as open seam tubular spacers of equal length. The three elements are held together by spot-welding. The reinforcing elements also include a longitudinal bore sized to receive a bolt, which, together with its nut, functions to connect a bracket to the structure.

U.S. Pat. No. 4,863,214 discloses a spacer tube matrix. The spacer tube matrix is intended for use within a vehicle frame having a box beam construction. The spacer tube matrix ensures a plurality of spacer tubes remain in alignment with apertures present within the side-walls of the box beam. The spacer tubes allow the bolts passing through the apertures to apply a substantial clamping force when holding the members of the frame together or affixing vehicle parts to the frame.

U.S. Pat. No. 6,309,157 discloses a screw with sleeve. The disclosed screw-sleeve element includes a screw comprising a shaft and a threaded region. The shaft has a smaller diameter than the diameter of the outer portion of the threaded region. In addition, the patent discloses a sleeve to be used in conjunction with the screw. The sleeve has a substantially cylindrical shape and includes a narrow portion having a diameter smaller than the remainder of the sleeve. The narrow portion diameter is also smaller than the outer diameter of the threaded region of the screw. This configuration allows the sleeve to encompass the screw in a non-releasable fashion.

A serious need exists for a simple construction and method of construction of frame members, resulting in at least equal, and preferably greater, frame strength and torsional stability, while reducing the costs of assembly and improving yield. This invention relates to improvements to the structures described above and to solutions to problems raised or not solved thereby.

SUMMARY OF THE INVENTION

The present invention provides a box-type structural assembly that provides substantial benefits in terms of strength and efficiency of manufacture. The assembly includes a first section having a web and a pair of flanges, and a second section also having a web and a pair of flanges. At least one spacer is positioned between the webs of the first and second sections. A first locator is positioned to coact with the first end of the spacer and the web of the first section, and a second locator positioned to coact with the second end of the spacer and the web of the second section. Each locator is configured to engage an end of the spacer to fix the position of the spacer relative to the web plane of first and second section, respectively. The flanges of the first and second sections are secured together, such as by welding, thereby completing a three-axis spacer location lock.

The invention also provides a method of assembling a box-type assembly. The method includes providing a fixture assembly, including a number of pilots. A first section, having a web, a pair of flanges and a number of holes with locators, is placed onto the fixture assembly with the holes fitting onto the pilots and the flanges facing away from the fixture. A spacer is placed over each of the pilots and engaged with the locator of the respective hole in the first section. A second section, having a web, a pair of flanges, and a number of holes with locators, is then placed onto the fixture assembly with the holes fitting onto the pilots and the flanges facing toward the first section, and second end of each spacer is engaged with the locator associated with the web of the second section. A substantial vertical force is applied to the outer surface of the web of the second section over each spacer, guaranteeing presence and alignment of each spacer, and eliminating any gap between spacer ends and the webs of the two sections. Finally, the flanges of the first and second sections are clamped tightly and secured together, such as by welding.

Various other features, objects, and advantages of the invention will be made apparent to those skilled in the art from the accompanying drawings and detailed description thereof.

BRIEF DESCRIPTION OF THE DRAWING FIGURES

DETAILED DESCRIPTION OF THE PREFERRED EMBODIMENTS

Figure 1:
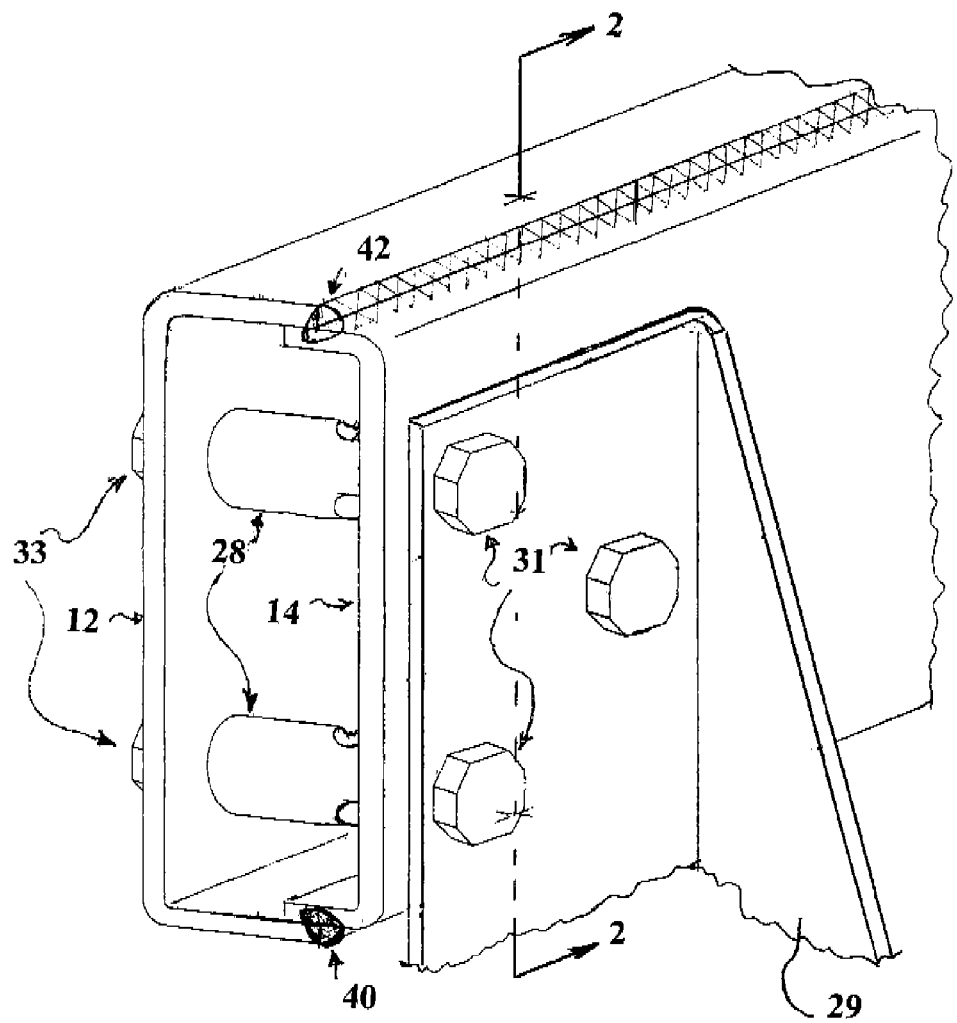
FIG. 1 is a perspective view of a boxed frame member constructed according to a preferred embodiment of the invention.
Figure 2:
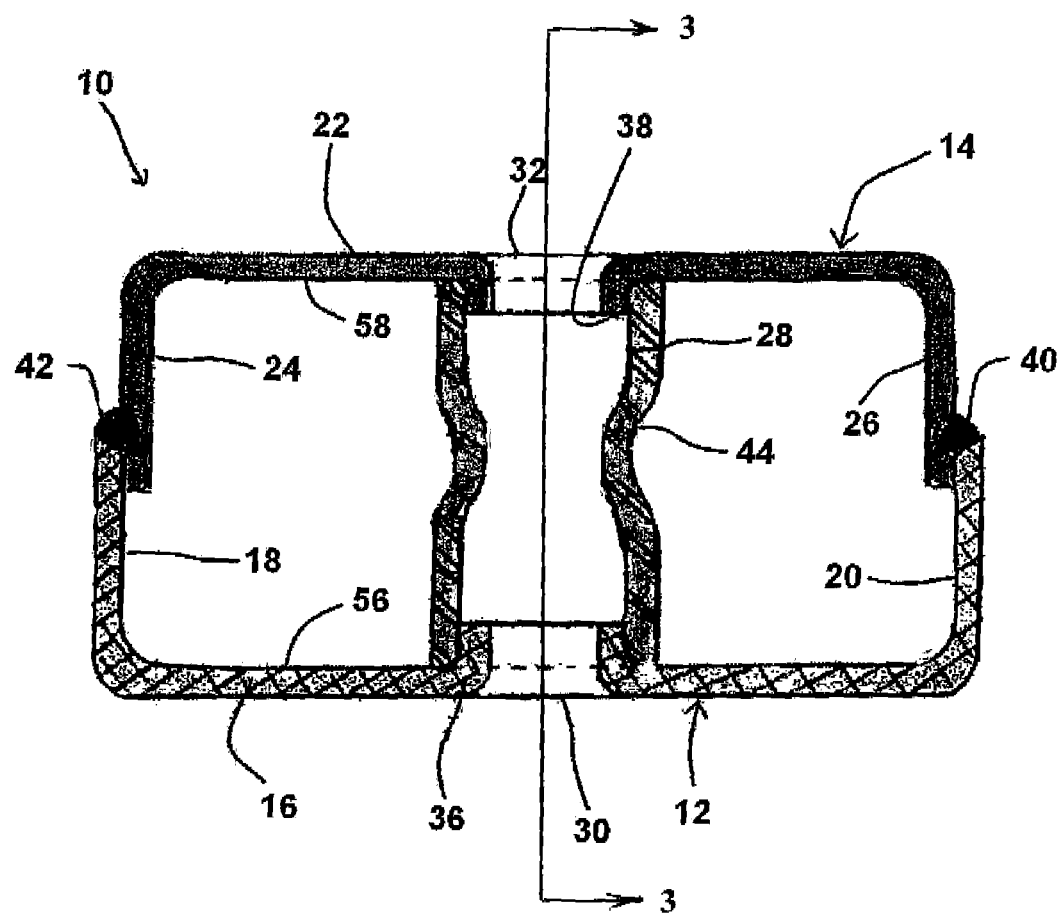
FIG. 2 is a section view of a portion of the boxed frame member depicted in FIG. 1 taken along section line 2-2, and with the bolt, nut and bracket removed.
Figure 3:
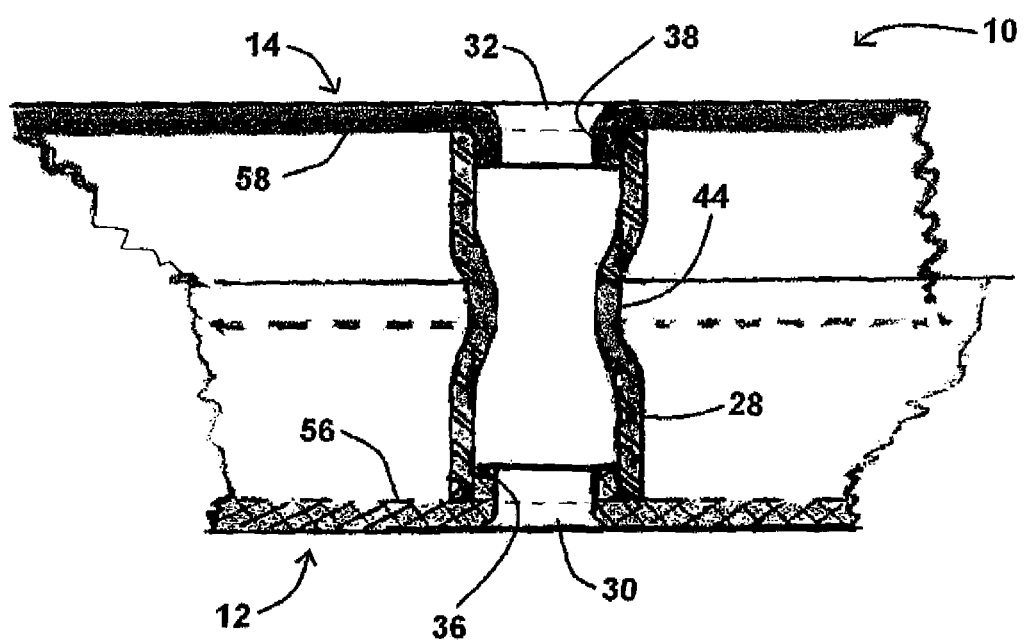
FIG. 3 is a section view of the boxed frame member depicted in FIG. 2 taken along section line 3-3.

One preferred embodiment of a box frame assembly 10 is depicted in FIGS. 1 and 2. The box frame assembly 10 preferably has an outer section 12 and an inner section 14. The outer section 12 is preferably formed from a generally U-shaped or C-shaped channel having a desired detail shape which may vary along its desired length, and includes a web 16 and two flanges 18, 20. The inner section 14 is also preferably formed from a U-shaped or C-shaped channel having a desired detail shape and length, which may be equal to the length of the outer section 12 and generally matching in detail, and includes a web 22 and two flanges 24, 26. The distance between the outside surfaces of the inner section flanges 24, 26 is roughly equal to the distance between the inside surfaces of the outer section flanges 18, 20. Therefore, the flanges 24, 26 of the inner section 14 are preferably located inside the flanges 18, 20 of the outer section 12 in a nesting configuration. It is understood that other configurations may be employed as well, including but not limited to "hat with cover" and "lipped channel with cover" configurations.

A series of cylindrical spacers 28 are disposed between outer section 12 and inner section 14 at future bolt attachment points for the joining of other frame members and components 29 by use of bolts 31 and their accompanying respective nuts 33. Spacers 28 function to space webs 16, 22 of inner and outer sections 12, 14, respectively, a predetermined distance apart from each other, both in the simple box assemblies and, later, while under the high compressive bolt torque of those joints. Each spacer 28 permits sufficient torque to be applied so as to elastically stretch the high-strength through-bolts at these joints, to guarantee a close-fit joint and to distribute subsequent service loads at the joint roughly evenly to both the inner and outer halves of the box assembly, without crushing or deflecting the webs 16, 22. Webs 16, 22 include substantially identical holes 30, 32 formed in the web 16 of outer section 12 and the web 22 of inner section 14. Hole 30 of the outer section 12 and hole 32 of inner section 14 have a substantially identical construction and are formed at the same locations along the lengths and heights of respective outer and inner sections 12, 14, so that each hole 30 is directly in alignment with one of holes 32 and vice versa. Each of the holes 30, 32 include locators 36, 38 for the spacers 28.

In the most preferred embodiment, the locators 36, 38 may be in the form of respective peripheral inner lips formed so as to extend inwardly from holes 30, 32, on the inside surface of the respective outer and inner sections 12, 14. In terms of process, the holes 30, 32 are formed as cupped through-holes in the respective webs 16, 22 of the respective outer and inner sections 12, 14. At the time each of the through-holes are formed in each web 16, 22, the respective locators 36, 38 are integrally formed as the peripheral inner lips, so as to extend inwardly from the inside surface of the respective outer and inner sections 12, 14.

Each end of cylindrical spacer 28 has an inside diameter slightly larger than outside diameter of the locators 36, 38 so that when each spacer is positioned between webs 16, 22, the locator 36 of hole 30 is engaged within one end of spacer 28 and the locator 38 of the aligned hole 32 is engaged within the opposite end of the spacer 28. The end of the spacer 28 surrounding the locator 36 engages the inside surface of web 16, and the end of the spacer 28 surrounding the locator 38 engages the inside surface of web 22. In this manner, spacers 28 serve as supports between the webs 16, 22. In addition to locating the spacers, locators 36, 38 increase the fatigue strength of the joint by moving the raw, pierced edge inboard, away from the high stress outer surface at the bolt points, and instead leaving the work-hardened cupped radius at the load points. The formed cup holes 30, 32 also add stiffness to the webs.

After all the spacers 28 are positioned between the web 16 of the outer section 12 and the web 22 of the inner section 14 in this manner, outer section 12 and inner section 14 are permanently connected together, such as by welds 40, 42 at the overlapping areas of flanges 18, 24 and 20, 26. Welds 40, 42 may be formed at intermittent spaced locations or, more commonly, continuously along the length of outer and inner sections 12, 14, respectively.

In one embodiment of the invention, each spacer 28 is formed with an area of narrowed inside diameter, shown as a plurality of indentations at 44a-c, which effectively make the inside diameter of the spacer 28 so as to be substantially equal to the inside diameter of the cupped holes. Specifically, in FIG. 5 the spacer 28 is shown with three separate indentations 44a, 44b and 44c, although it is understood that any desired number of indentations sufficient to define this reduced diameter circle may be used, or the spacer could be formed with a continuously reduced, or "swedged," center diameter, or with two opposed, reduced arcs.

All holes 30 in outer section web 16 and all holes 32 in inner section web 22 are formed, in a preferred embodiment, simultaneously in a piercing operation, which assures consistency in the spacing and positioning of the holes 30, 32. In the most preferred embodiment, the holes 30, 32 are formed so that the respective locators 36, 38 are extruded or cupped inwardly either at the bottom of the piercing stroke of the piercing tool used to form the holes 30, 32 (sometimes known as a "nail-pierce"), or, more commonly in a second operation, also simultaneously. That is, all holes would first be pierced simultaneously; and, in the second press stroke, all cupping would be done simultaneously. Thus the relative location of the holes, and of their cupped lips, will be as repetitive and consistent as the tooling. This, in turn, permits precise location over pilots in the subsequent spacer-and-box-assembly operation, with minimal gaps or binding.

Figure 4:
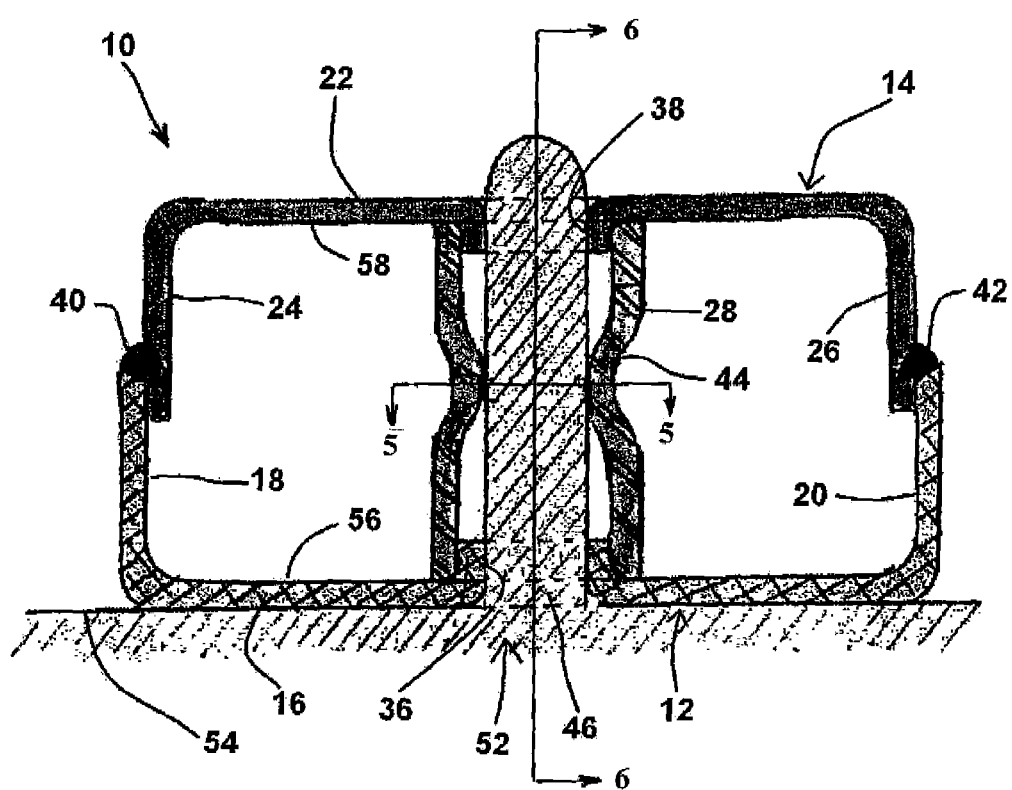
FIG. 4 is a section view of the boxed frame member shown in FIG. 1, before it is removed from the fixture.
Figure 5:
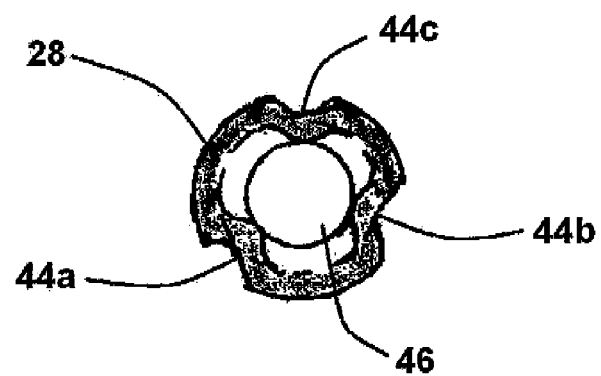
FIG. 5 is a section view of the spacer and pilot shown in FIG. 4, taken along line 5-5.
Figure 6:
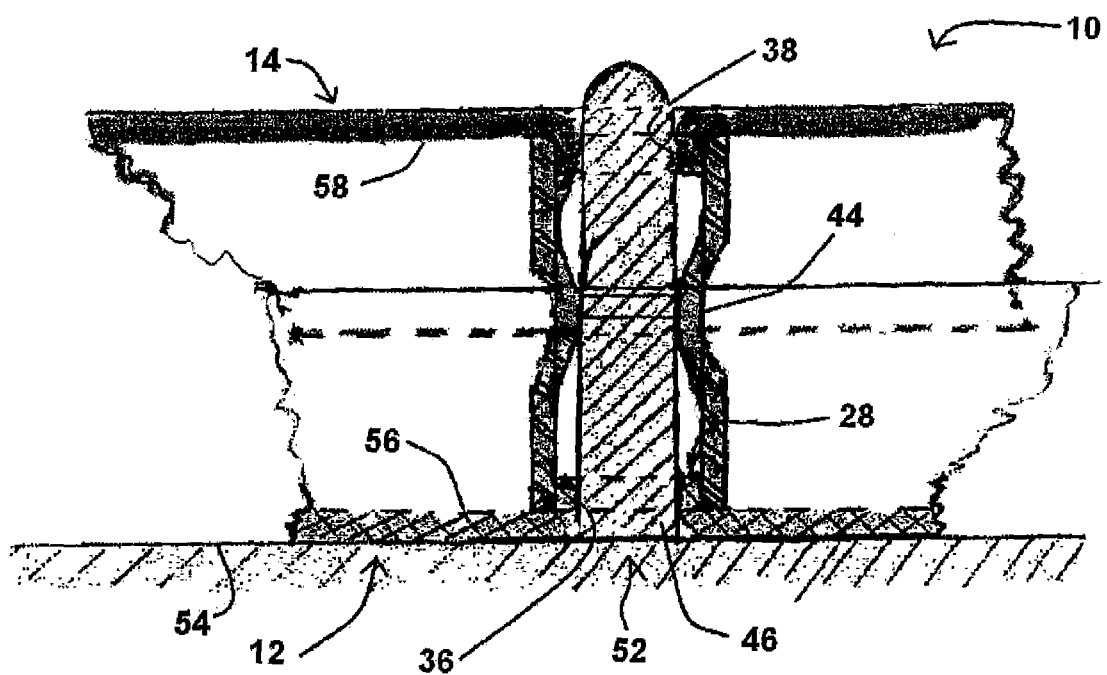
FIG. 6 is a section view of the boxed frame member and fixture shown in FIG. 4, taken along line 6-6.

With reference to FIGS. 4, 5 and 6, in assembly, the outer section 12 is laid on a fixture assembly 52 with a number of pilots 46 corresponding to the number of holes 30 in the outer section. The fixture assembly 52 includes a support surface 54 supportively conforming to the shape of the outer section 12. In the embodiment shown, each pilot 46 is in the form of an upstanding, axially-extending, elongated member having an outside diameter only slightly less than the reduced inside diameter defined by indentations 44a, 44b and 44c of spacers 28, and also of the inside diameters of the 30, 32 holes in the outer and inner sections 12, 14. The pilots 46 are anchored to fixture assembly 52. In the most preferred embodiment, the distal ends of the pilots have a rounded point to ease entry and to guide and center the inner diameters of the cupped holes 30, 32 in both the outer and inner channel members 12, 14, and the reduced center diameter 44 of the spacers 28 that span and encompass those cupped holes between the two channel members. The pilots 46 are inserted into the holes 30 when the outer section 12 is laid on the fixture assembly 52. A spacer 28 is then slipped over each pilot 46 and corresponding hole 30. The inside diameter of the spacer 28 is large enough at the ends to achieve a close "slip-fit" around the outside surface of the locator 36. The spacer indentations 44a-c center the spacer 28 on the pilot 46 and over the hole 30. The inner section 14 is then lowered snugly over the pilots 46 so that the cupped holes 32 of the inner section 14 fit into the spacers 28. The length of pilot 46 is sufficient to extend completely through the spacer 28 and the holes 30, 32 of the outer and inner sections 12, 14, respectively. Thus the pilots 46 can serve to simultaneously align the three components—outer section 12, inner section 14 and spacers 28—during the assembly process. This precise relative location of the cupped holes 30, 32, as previously described, permits easy insertion of the two channel members 12, 14 and of the spacers 28 over these pilots 46, without binding, and with minimal gaps. This, in turn, permits easy manual processing, or the option of full automation of the assembly process. Minimal clearance between the inside of the spacer 28 and the cupped holes 30, 32 is desirable but not essential; as it keeps the required flat area surrounding around the holes small, which may be important to other mounting or clearance needs.

Sufficient force is applied to each section containing a spacer 28 to crush the box in the event of a missing or misaligned spacer 28. This application of force also serves to ensure intimate contact between the ends of the spacer 28 and the inside surfaces 56, 58 of the outer and inner section webs 16, 22, respectively. The application of force may be through use of a clamping tool which centers on the existing pilots and applies bearing force with a circular "shoulder" against the outside of the inner member web 22, directly over each spacer 28. The flanges 18, 20 of the outer section are then clamped to the flanges 24, 26 of the inner section. After clamping, the pilots are preferably removed from the holes 30, 32 and the sections 12, 14 are then welded together, preferably using gas-metal arc welding (GMAW) robots. Pilot removal prior to welding would prevent any binding of the assembly on the pilots due to weld distortion, but would require that the pilots be able to move separately from the lower fixture base on which the outer member 12 lies. Alternately, and more commonly, the pilots can be mounted solidly to that base surface, and any binding from weld distortion can be overcome be hydraulic or other "lifters" in the fixture. Once the flanges of outer section 12 and inner section 14 are welded together in this manner, the spacers 28 remain tightly held between the webs 16, 22, and are constrained from shifting by the locators 36, 38 on the respective webs without welding of the spacer ends as in the prior art. Any slight elastic spring-back of the channel member webs 16, 22 from the ends of the spacers 28 will be clamped out during subsequent bolting at each spacer location.

In general, each spacer site will serve as the site of a through-bolt attachment of other components or frame members to this box assembly during subsequent vehicle assembly. As these joints may be severely loaded under vehicle service, the work-hardened material of the cupped holes will perform much better under fatigue loading than would the raw holes of the prior art—perhaps permitting use of lighter section stock thickness. Furthermore, the elimination of the need for spacer welding at the load point of these highly loaded joints, and/or separate spacer mounting plates which are later welded to the section webs, as required in the prior art, avoids the weld distortion, the cost and the potential for fatigue degradation due to the heat affected zones of the welds, and/or potentially numerous weld defects. The invention also eliminates product dimensional variation which is inherent in the distortion variability of multiple manual welds. Cupping of the holes also adds stiffness to the webs. Thus this spacer design is lighter, more dimensionally consistent, stronger, stiffer and more fatigue-resistant, while also being less expensive.

When the holes 30, 32 are formed as cupped holes, the inside surfaces of the webs 16, 22 are formed with a radius at each lip, locator 36, 38. Each end of each spacer 28 may be formed with a matching inside radius, or chamfer, to avoid stress concentrations that may result from sharp perpendicular inside corners at the spacer ends. This chamfer effect also serves as a lead-in, when feeding the spacers 28 over the lipped inner edge of the holes 30, 32.

Figure 7:
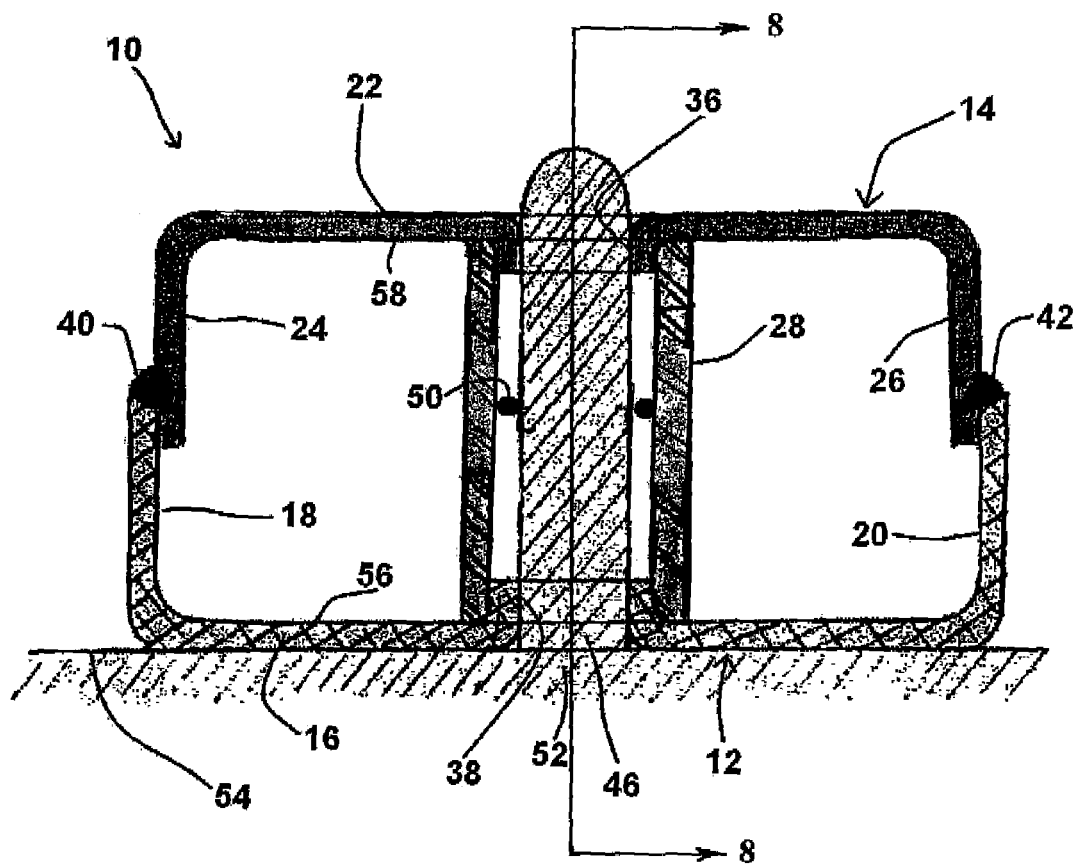
FIG. 7 is a section view of another embodiment of the invention, showing the boxed frame member and fixture.
Figure 8:
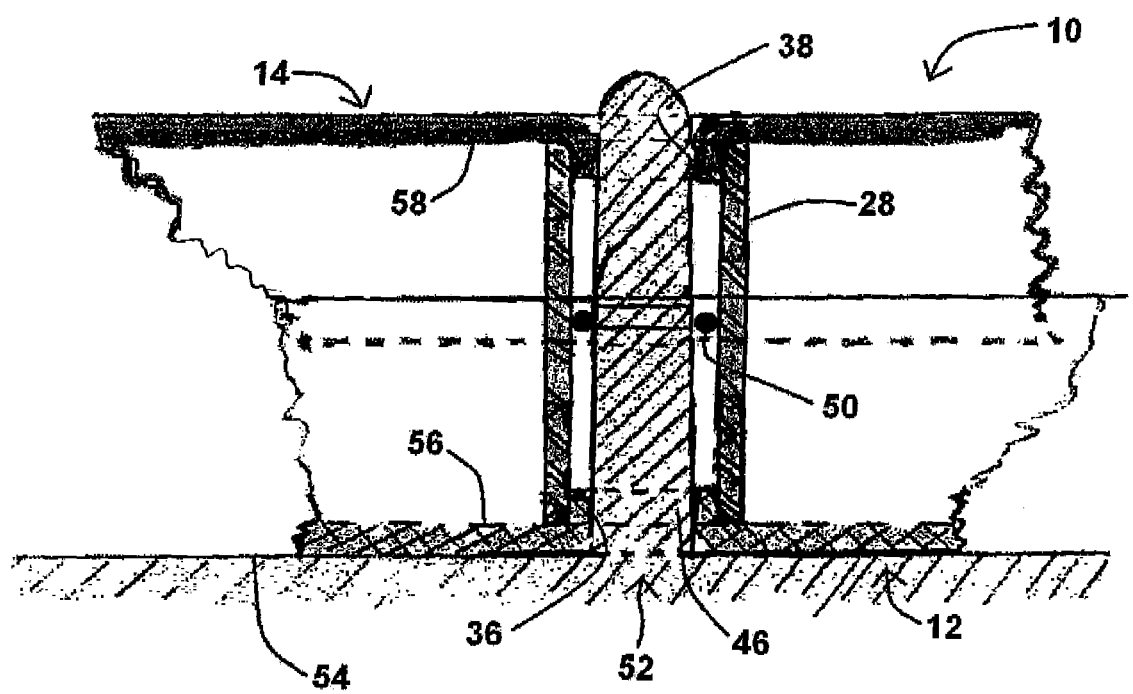
FIG. 8 is a section view of the component and fixture shown in FIG. 7, taken along line 8-8.

In an alternative embodiment, best seen in FIGS. 7 and 8, the spacer has no indentations. Instead, a ring 50 is placed over the pilot 46 after insertion into the hole 30 of the outer section 12. The ring 50 is preferably made from a material that could be beneficial when sacrificed, such as zinc, or that is non-reactive to galvanizing or e-coating, such as certain plastic materials. Ring 50 performs the same function as indentations 44*a-c*, that is, centering spacer 28 during the assembly process.

When the pilot 46 has a ring 50 as the centering means for the spacers 28, the manufacturing process for a box frame assembly 10 is altered slightly, as best seen in FIGS. 7 and 8. The outer section 12 is placed on the fixture assembly 52 in the same manner as described above, with the pilots thereby inserted. A ring 50 is slid over each pilot 46. When the pilots 46 are removed from the box frame assembly 10, the ring 50 will remain inside the spacer 28 as the locator 36 prevents the ring 50 from exiting with the pilot 46. The box frame assembly 10 is then completed as described above.

In certain applications, such as where the opposing webs are not parallel to each other, or where the webs are parallel but are not perpendicular to the desired bolt angles, angled spacers may be required in place of, or addition to, the primary, vertical spacers as shown and described above. In such an application, the location of the angled spacers is fixed by means of cupped holes in the outer and inner sections, but the cupped holes of the outer section and inner section are offset from each other rather than directly aligned as described previously. In this embodiment, the spacer may be formed with angled ends, which define the openings in the ends of the spacer within which the offset cupped holes are received. When the spacer is in place between the outer section and inner section, the ends of the spacer are in full contact with the respective inside surfaces of the outer section and inner section in this embodiment. To avoid interference, angled pilots are provided, and required to advance and retract separately from the primary vertical pilots. The angled pilots are inserted only after the outer section is positioned over the primary pilots. Then the angled pilots would advance far enough to center their respective spacers, but not so far as to interfere with the vertical lowering of the inner section over the vertical spacers. The rounded point of the angled pilots would only engage their respective cupped holes of the inner section when the latter is fully centered and nested in its vertical spacers.

Figure 9:
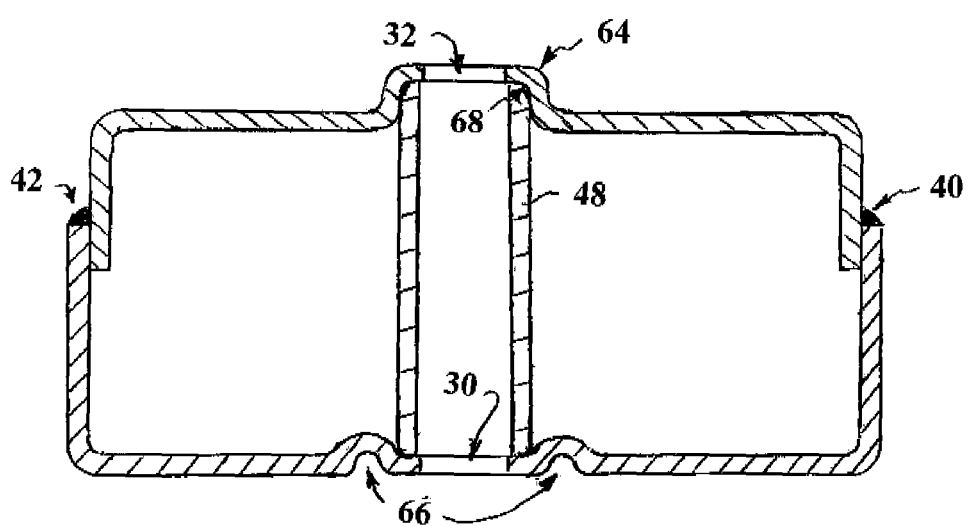
FIG. 9 is a section view of yet another embodiment of the invention, showing alternate locator embodiments.

Referring now to FIG. 9, in another embodiment, an indented circular form may be stamped into the web of the outer and/or inner sections in place of the cupped holes as shown and described. The indentation could be either outboard to the box (a "sump" 64 as viewed from inside the box) or inboard to the box (a formed "ring" 66 sized to fit around the end of spacer 48), in either case with the bolt hole 32, 30 in its center. Either embodiment has the advantage of allowing the diameter of the spacer 48 to be sized to the hole, pilot and bolt, that is, with a smaller overall inside diameter, without spacer indentations. Each of these two embodiments, however, would lose the fatigue strength advantages of the cupped hole. Further, the outboard sump could cause clearance issues (normally as large a box section as the surrounding environment permits is desirable, thus permitting lighter stock for a given section stiffness). The formed ring 66 would require a bigger footprint on the web, limiting closeness to other bolts or to other features. Each of these embodiments of locator has advantages in specific circumstances. Each such indentation surrounds an end of one of the spacers 48, similar in function to having the spacer surround the cupped hole in the embodiment described above. Each would locate the spacer 48 and provide positive engagement between the spacer end and the inside surface of the web. Where the indentation surrounds the spacer 48, the locating function is being accomplished with respect to the outside diameter of the spacer 48 as opposed to the inside diameter as with the cupped holes. In each of these latter two embodiments, an outside diameter chamfer 68 of the ends of the spacer 48 is preferred, in that the chamfer has the beneficial effect of centering the spacer within the outer locator form, and avoiding having a sharp, perpendicular cylinder corner pressing into the radius transitioning between the short, cylindrical bearing surface of the locator and the web from which it was formed. Again, these locators perform essentially the same function as the cupped holes as shown and described previously, but without cupping the bolt passage holes 30, 32 in the webs 16, 22 of the inner and outer sections 12, 14. Both of these latter two embodiments function to locate the spacers along the length and height of the outer and inner frame members, and prevent the spacers from shifting after assembly. The indentations and outward circular forms may include openings in the webs of the frame members, but the openings need not be cupped as in the embodiment shown and described previously. In assembly, the spacers 48 do not require indentations 44a-c or rings 50, since the material of the frame member webs is not cupped so as to extend inside the end of the spacer. The spacers 48 can thus be slip-fit over the pilots. As the cylindrical diameter of spacer 48 is the same between the locator in the form of the ring 66 and locator in the form of the sump 64, the locators of this embodiment can be employed either as a matched pair between the first and second section webs (as was the case with the preferred cupped hole locators, previously shown), or the ring and sump locators can be mixed in one assembly, as shown in FIG. 9.

These joint constructions, as shown and described, have the same advantages as a conventional bolt-through-spacer joint, as is known in the art; but they eliminate the cost, quality and fatigue sensitivity associated with such prior art constructions involving welded spacer ends. The joint construction reduces part costs and involves a relatively simple, cost-efficient manufacturing process. Such a process lends itself to relatively easy automation, through robotic insertion of the spacers and automatic box clamping and robotic welding, as volume may justify.

Other advantages of the spacer joint construction of the present invention include added web stiffness at each spacer-locating web form feature; elimination of the cost of separately clamping and welding of each spacer; elimination of the weight and cost of a separate spacer mounting plate; elimination of the weld assembly of the spacer mounting plates to the inside web 16 or 22 of either the outer 12 or inner 14 section (all as may be required in the prior art); elimination of each spacer weld's fatigue-detrimental heat-affected-zone; greater quality by elimination of potential for weld heat distortion, variability, and defects at each spacer weld; improved ability to inspect, in that the spacer welds inside of the box assemblies, of prior art, could not be inspected after the boxes were welded shut (in the present invention the section-crushing clamping force at each spacer site in the assembly fixture guarantees the presence and proper alignment of each spacer, or the section is destroyed); replacement of the fatigue-detrimental raw hole edge at the spacer's interface with the channel webs, at the subsequent bolt load points, with the fatigue-enhancing work-hardened metal of the cupped radii (in the preferred embodiment); reduced need for reinforcing patches (sometimes required in the prior art) due to the durability enhancements of the present invention; and local sourcing, based on greater ease of automation, and elimination of much hand labor, which increases the potential for local sourcing vs. sourcing to a low-labor-cost environment.

While the spacers shown here are simple cylindrical tubes, it is understood that a seam-welded tube would work equally well, as would an open seam tube (as the spacer is loaded by its bolt in compression, not torsion). The latter, with or without indentions for a reduced center diameter, can be fabricated in an unmanned, coil-fed, progressive-die at a small fraction of the cost of a closed tube. In like manner, it is common practice for those skilled in the art to use a single spacer for a related pattern of holes, such as for a steering gear mount. The most efficient such designs involve multiple open tubes (usually 2, 3, or 4-loop), inter-connected by flat strips, all integrally formed from a single piece of metal, and again, fabricated by an unmanned, coil-fed progressive die. At this level the tool is more expensive, but the savings are large over typical high-volume automotive applications. Unit cost for the spacer is little more than the material, which is a small fraction of the cost of closed tubes. Additionally, during assembly of the box member, the operator (or automation) need only handle one part per pattern vs. several tubes. Again, if "cupped hole" locators are selected, such multiple integral tube spacers can easily be given indentations for a reduced center diameter, in the progressive-die operation. Steering gear mounts (usually 3-loop) constitute a common use of spacers in high-volume, light truck frame assembly. In addition to eliminating the cost of the current spacer welding, cupped hole locators at this very high stress area might solve durability problems or permit gage reduction. Steering idler attachment (usually 2-loop) is probably second common in use, and again would benefit from the superior fatigue performance of the cupped hole approach. The next most common use of 2-loop spacers might be at commonly removable crossmember attachments, such as are used at a torsion bar anchor or the transmission mount. The former is, again, a high-stress joint. Any of these open seam tube spacers (either single or multiple loop) are preferred embodiments for cost containment.

While the invention has been shown and described in the context of joining together other frame members or attaching components that are used in an automotive or other vehicular frame, it is also understood that the structure and assembly method as shown and described may be used in spot welded automotive body structure, or in other applications. While the invention has been described with reference to preferred embodiments, those skilled in the art will appreciate that certain substitutions, alterations and omissions may be made to the embodiments without departing from the spirit of the invention. Accordingly, the foregoing description and embodiments discussed are meant to be exemplary only, and should not limit the scope of the invention.

I claim:

1. A method of assembling a box-type assembly, the method comprising
    providing a first section having a web and a pair of flanges and a second section having a web and a pair of flanges,
    inserting a manufacturing pilot through a cupped-hole locator formed in the web of the first section,
    positioning a first end of a spacer over the manufacturing pilot and over the cupped-hole locator of the first section, where the cupped-hole locator of the first section includes a lip structure that extends away from the first section and into the spacer,
    engaging a second end of the spacer over a cupped-hole locator formed in the web of the second section, where the cupped-hole locator of the second section includes a lip structure that extends away from the second section and into the spacer, securing the flanges of the first and second sections together, and removing the box-type assembly from the manufacturing pilot.

2. A method of assembling a box-type assembly, the method comprising providing a fixture assembly, including a number of pilots;

placing a first section, having a web, a pair of flanges and a number of holes with locators, onto the fixture assembly with the holes and locators fitting onto the pilots and the section flanges facing away from the fixture;

placing a spacer over each of the pilots and engaging the spacer with the locator of the respective hole in the first section, wherein the locator extends into the spacer;

placing a second section, having a web, a pair of flanges, and a number of holes with locators, onto the fixture assembly with the holes fitting onto the pilots and the section flanges facing toward the first section, and with the locator associated with the web of the second section extending into the second end of each spacer; and securing the flanges of the first and second sections together.

3. The method of claim 2 wherein the spacer includes indentations adapted to center the spacer on a respective pilot.

4. The method of claim 2 wherein a ring is placed over the pilot before the spacer is placed over the respective pilot, to center the spacer on the pilot.

5. The method of claim 2 wherein the locator comprises a cupped hole formed in the web of the respective section, where the cupped hole includes a lip structure that extends away from the respective section and into the spacer.

6. A box-type structural assembly comprising;

a first section having a web and a pair of flanges;

a second section having a web and a pair of flanges;

a first locator disposed on the web of the first section, and a second locator disposed on the web of the second section;

at least one spacer positioned by the first and second locators between the webs of the first and second sections, the spacer having a first end and a second end, wherein the first end of the spacer is positioned around the first locator and the second end of the spacer is positioned around the second locator;

wherein the locators comprise opposed cupped holes in the webs of the first and second sections, wherein each cupped hole is defined by a raw edge that has been cupped away from the respective web to form a lip structure that extends toward an opposing cupped hole, such that the cupped hole on the locator of the first section has a lip structure extending toward the locator of the second section and the cupped hole on the locator of the second section has a lip structure extending toward the locator of the first section;

wherein the lip structures of the cupped holes extend into void areas of the spacer; and securing means for securing the flanges of the first and second sections together.

7. The box-type assembly of claim 6 wherein, the spacer comprises a cylinder with at least one inside diameter, wherein at least a portion of the at least one inside diameter is approximately equal to an outside diameter defined by the lip structure.

8. The box-type assembly of claim 7 wherein the spacer further comprises a plurality of indentations having the effect of reducing a portion of the inside diameter.

9. The box-type assembly of claim 7, further comprising a ring disposed within a passage defined by the spacer.

10. The box-type assembly of claim 9, wherein the spacer comprises a simple cylinder.

11. A box-type assembly comprising:

an outer frame section and an inner frame section, each frame section including a web and a pair of flanges, wherein the flanges of the frame sections are secured together to form an interior space;

an outer frame hole provided in the web of the outer frame section, and an inner frame hole provided in the web of the inner frame section and opposing the outer frame hole;

lip structures disposed around each of the holes, wherein the lip structures extend into the interior space and form a wall that defines at least a portion of the outer edges of the hole; and a spacer having an interior spacer void and positioned between the frame sections and inserted around the lip structures such that the lip structures extend into the spacer void.

12. The box-type assembly of claim 11, wherein the spacer has a plurality of indentations that reduce the dimensions of the spacer void.

* * * * *